L. B. HALLOCK.
AUTOMOBILE LOCK.
APPLICATION FILED AUG. 25, 1917.
1,288,569.
Patented Dec. 24, 1918.
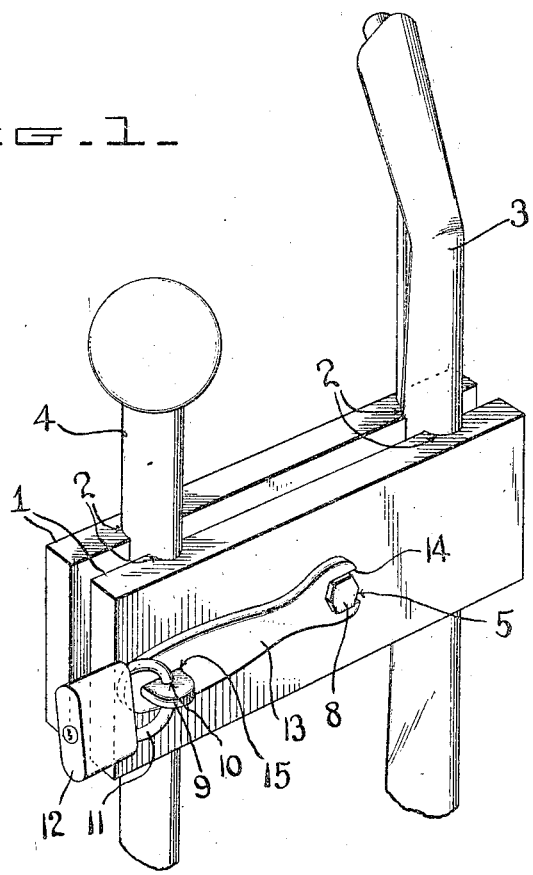
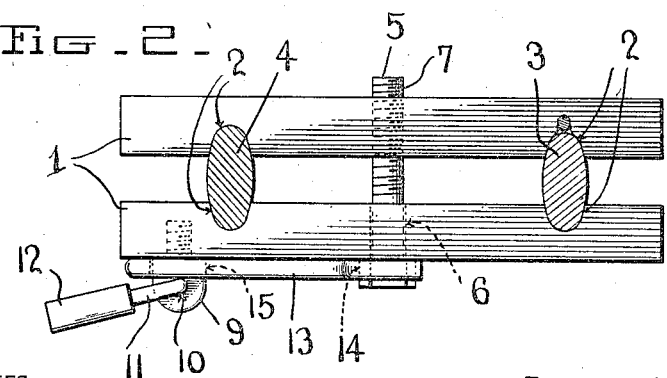
WITNESSES
L. B. James
R. M. Smith
INVENTOR
Lloyd B. Hallock
BY Victor J. Evans
ATTORNEY

UNITED STATES PATENT OFFICE.

LLOYD B. HALLOCK, OF AKRON, OHIO.

AUTOMOBILE-LOCK.

1,288,569.  Specification of Letters Patent.  Patented Dec. 24, 1918.

Application filed August 25, 1917. Serial No. 188,149.

*To all whom it may concern:*

Be it known that I, LLOYD B. HALLOCK, a citizen of the United States, residing at Akron, in the county of Summit and State of Ohio, have invented new and useful Improvements in Automobile-Locks, of which the following is a specification.

This invention relates to automobile locks, the object in view being to provide a simple device whereby the emergency brake lever and the gear shifting lever of a motor vehicle may be securely and reliably clamped in a certain fixed relation to each other, the said means being of novel, simple and efficient construction and capable of being adjusted to suit different vehicles.

With the above and other objects in view, the invention consists in the novel construction, combination and arrangement of parts, herein fully described, illustrated and claimed.

In the accompanying drawings:—

Figure 1 is a perspective view showing the locking device in its applied relation to the emergency brake lever and gear shifting lever.

Fig. 2 is a plan view of the device showing the levers of the motor vehicle in section.

The automobile locking device contemplated in this invention comprises a pair of clamping members 1 each shown in the form of a block or bar, preferably composed of metal. The clamping members 1 are formed in the adjacent inner faces thereof with grooves 2 extending transversely of the members 1 and in a substantially vertical direction when the clamping device is in its applied position. The grooves 2 are intended to receive the emergency brake lever 3 of a motor vehicle and also the gear shifting lever 4, said levers being arranged in their usual position and side by side when the emergency brake lever is in its brake applying position.

The clamping members 1 are connected together by means of a centrally arranged clamping screw 5 which has a smooth portion journaled in a smooth hole 6 in one of the clamping members and a threaded part 7 engaging a threaded hole in the other clamping member. By turning the screw 5, the clamping members may be moved toward or away from each other. At one end the screw 5 has a head 8 of suitable formation to receive and be turned by means of a wrench or the equivalent thereof.

One of the clamping members 1 has extending from the outer face thereof an eye-piece 9 formed with an eye 10 to receive the hasp 11 of a lock 12, shown in the form of an ordinary pad-lock. 13 designates a clamp screw turning lever having a slot 14 in one end thereof adapted to receive the head 8 of the screw 5 and formed adjacent to the other end thereof with a slot 15 adapted to receive the eye-piece 10. When the lever 13 is in its locking position, the hasp of the lock 12 is inserted through the eye 10 and the lock closed. This prevents the lever 13 from being used by an unauthorized person. The lever 13 acts as a lock for the clamping screw 5 and prevents a wrench from being used on the head 8 of the clamping screw as said screw cannot be turned by a wrench on account of the clamping screw turning lever 13.

The device is simple in construction and operation and may be manufactured and sold at a small cost and will be found practical and reliable in use. The clamping members may be drawn by means of the screw 5 into tight fitting engagement with the control levers 3 and 4 of the vehicle.

I claim:—

In an automobile lock, the combination of a pair of clamping members formed in their adjacent faces with grooves to receive the emergency brake lever and gear shifting lever of a motor vehicle, a clamping screw passing through said members and having a polygonal head, an eye-piece projecting from one of said members, a detachable wrench shaped lever having a slot in one end thereof to fit the head of the clamping screw and formed adjacent to the other end thereof with a slot to receive said eye-piece, and a lock insertible through and removable from said eye-piece and serving to hold said turning lever in engagement with the clamping screw.

In testimony whereof I affix my signature.

LLOYD B. HALLOCK.

Copies of this patent may be obtained for five cents each, by addressing the "Commissioner of Patents, Washington, D. C."